United States Patent [19]

Benz et al.

[11] Patent Number: 4,594,891
[45] Date of Patent: Jun. 17, 1986

[54] RESONATING ROD

[75] Inventors: Karl Benz, Schiltach; Gerhard Huber, Wolfach-Kinzigtal, both of Fed. Rep. of Germany

[73] Assignee: VEGA Grieshaber GmbH & Co., Schiltach, Fed. Rep. of Germany

[21] Appl. No.: 487,866

[22] Filed: Apr. 22, 1983

[30] Foreign Application Priority Data

Apr. 22, 1982 [DE] Fed. Rep. of Germany ....... 3215040

[51] Int. Cl.$^4$ ............................................. G01F 23/28
[52] U.S. Cl. .................. 73/290 V; 73/290 R
[58] Field of Search ................ 73/290 V, 290 R, 579, 73/DIG. 1; 376/908; 374/117, 118, 119; 310/321

[56] References Cited

U.S. PATENT DOCUMENTS

| | | | |
|---|---|---|---|
| 4,130,018 | 12/1978 | Adams et al. | 73/290 V |
| 4,240,285 | 12/1980 | Langdon | 73/290 V |
| 4,337,656 | 7/1982 | Rapp | 73/290 V |
| 4,383,443 | 5/1983 | Langdon | 73/290 V |
| 4,499,765 | 2/1985 | Benz et al. | 73/290 V |

FOREIGN PATENT DOCUMENTS

| | | | |
|---|---|---|---|
| 2529239 | 2/1977 | Fed. Rep. of Germany | 73/290 V |
| 54-39158 | 3/1979 | Japan | 73/290 V |

*Primary Examiner*—Charles Frankfort
*Assistant Examiner*—David R. Schuster
*Attorney, Agent, or Firm*—Dennison, Meserole, Pollack & Scheiner

[57] ABSTRACT

A filling level measuring probe detects the filling level in a container by suppression of an oscillator by contact with a filling material. The oscillator consists of a hollow body 16, which can be connected through a shaft 14 and a screw-in part 12 with a container wall 10 and is set in oscillation with oscillations in the radial direction over a crosspiece 20 mounted in hollow body 16 by means of an electromechanical transducer 26 which is mounted on crosspiece 20. The oscillations are converted by a second electromechanical transducer 28 into an electric signal, of which the amplitude is changed with suppression of the oscillations as a result of contact of the hollow body 16 with the filling material.

18 Claims, 7 Drawing Figures

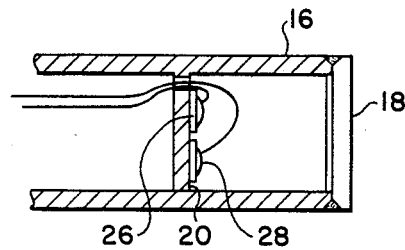
FIG. 3
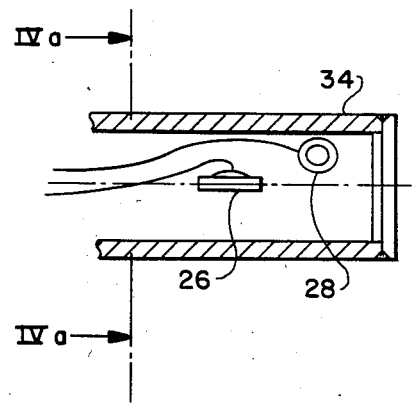
FIG. 4
FIG. 4a
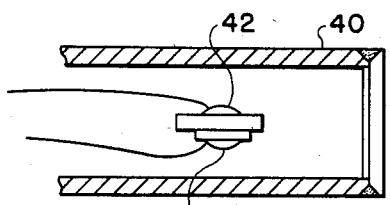
FIG. 5

RESONATING ROD

The invention relates to a device for determination of a specific filling level of a filler material in a container.

A device of this sort is already known from GB-PS No. 1 013 186, wherein an oscillator excited to oscillate by an electromechanical transducer projects into a container. Another electromechanical transducer responds to the oscillations by discharging an electric signal. When the oscillator contacts the filling material, the oscillation is suppressed, which changes the amplitude of the electric signal. The amplitude change is converted into a suitable detection circuit to indicate the level of filling.

With this known filling level measuring device, however, the oscillator configured as individual oscillating rod exercizes notable conversion force on the clamping device and thus on the container wall. The no-load losses during formation of the oscillations are correspondingly large and the oscillation drive system therefore must be laid out stress-resistant in order to maintain the oscillations. Therefore, the suppression which is caused by immersion of the oscillator in light bulk materials, as a result of the effect of the bulk material on the oscillator, does not suffice to produce a measuring technique capable of the evaluation of the oscillation amplitude reduction. A similar device which is subject to the same limitations is known from DE-PS No. 582 760.

If any filling material is to be measured and if the detection efficiency is to be almost independent of the stress ratios of the oscillator, then it necessarily costs more, as for example in DE-OS No. 30 11 603, the device of this same applicant, wherein two specially arranged and configured oscillators are used. Setting or tuning procedures are required for the use. Although this known device works excellently, a lower cost is still of utmost importance.

The invention therefore provides a filling level measuring device which overcomes the present limitations of the present state of technology.

In the invention, the oscillator comprises a hollow body, in the hollow chamber of which is arranged a crosspiece which is fastened at at least two mounting points on the inside walls of the hollow chamber, on which is mounted the first electromechanical transducer, and the crosspiece can be set in oscillation by the transducer with oscillations directed toward the attachment points.

The technical teaching of the invention leads to a surprisingly simple device, which need not be specially adjusted because of its simplicity and design. The entire oscillator is extremely strong and can therefore be used under the most difficult conditions. It is also very advantageous that mechanical disturbance of the transducer is practically impossible with the arrangement according to the invention, wherein the first electromechanical transducer exciting the oscillation is mounted on the crosspiece, which lies protected in the hollow chamber of the oscillator.

In one advantageous embodiment of the invention, the oscillator oscillates at its resonance frequency. Because of the simple geometric design of the oscillator, this causes the advantageous outcome that variations of the resonance frequency of only a few 100 Hz occur, at a resonance frequency between 20 and 30 kHz. Therefore, the circuit exciting the first electromagnetic transducer and the detection circuit could be set beforehand at a reference value of the resonance frequency within a tolerance range of a few kHz, without requiring adjustment devices or operations.

In one preferred embodiment of the invention, the hollow body is cylindrical. Pipe sections of standard dimensions could therefore be used.

In other advantageous embodiments, the cylinderical body is closed at one or both ends. The transducers in this case are not in contact with the filling material and they are thus optimally protected.

The measuring device according to the invention is used in one advantageous configuration by screwing in or a flange attachment on the inside of the container of which the filling level is to be measured. IN this case, the configuration advantageously includes a shaft at one end, and the shaft is correspondingly detachably attached.

In another advantageous embodiment of the invention, the measuring device is not mounted in the container, but rather can be lowered into the container on a cable or line, in the manner customary to filling level measuring technology. The measuring device or its condition can be checked particularly simply with this embodiment. If the hollow body is cylindrical, then its longitudinal axis is most advantageously oriented vertically, and its bottom end is closed by a cover.

In another advantageous embodiment of the invention, the crosspiece is configured as a circular disk, the periphery of which is connected with the inside wall of the cylindrical hollow body. This very symmetrical design is extremely stable mechanically and, as a further advantage, at least the first electromechanical transducer can be attached to the disk in a simple manner, and then it need only be inserted into and connected with the cylindrical body. In this case, the manufacture is quite low cost.

This advantage is more clearly represented with another embodiment of the invention, wherein the second electromagnetic transducer is likewise attached to the crosspiece.

In both exemplary embodiments shown in the figures, the transducer exciting the oscillation and the transducer detecting the oscillation are mounted on opposite sides of the crosspiece. However, the second transducer can be mounted on the same side as the first transducer, dependent upon the dimensions and/or intended use. It is even possible in principle to mount the second transducer at nearly any point, for example inside, on the hollow body or on the cover.

The simple very symmetrical construction according to the technical teaching of the present invention is particularly clear from the above description together with the exemplary embodiments shown in the drawing. With this, a filling level measuring device is provided which is cost effective in manufacture and both strong during use and also of high detection capacity.

In another preferred embodiment of the invention, the hollow body has an oval transverse cross section, the crosspiece in this case configured as a rod extending along the short transverse axis of the oval. The thin structure is particularly suitable for a construction in which the large transverse axis of the oval is perpendicular. In other words, although the surface which is liable to suppression, in contact with the filling material and parallel to the large transverse axis of the oval, is larger than in the case of a circular oscillator, hardly any filling material can remain lying on the oscillator because of the surface projecting slightly at a right angle to the transverse axis. The oscillator is thus made more rigid in the direction of the bulk material falling on the oscillator. Also with this embodiment, similar modifications are possible as with the cylindrical embodiment, which are disclosed in other dependent claims.

In another advantageous embdoiment still another simplification is provided in that the first and/or the second electromechanical transducer is constructed as crosspiece. For example, disk-shaped piezoelectric transducers with a hole in the middle can be obtained commercially. Such disk-shaped transducers could be mounted directly on the periphery of the hollow body by adhesive. Wires could be fed through the hole in the middle. Such an embodiment consists of only a few parts and is therefore of particularly low cost to manufacture and still is less likely to break down.

In another advantageous embodiment, the first and/or the second electromechanical transducer is a piezoelectric transducer. Such transducers can be manufactured in a number of shapes and dimensions, so that they can be simply adapted to the relevant use desired.

The invention is to be explained in more detail in the following, relative to the exemplary embodiments shown in the drawing, showing further features and advantages of the invention. The drawings show:

FIG. 1, a first embodiment of the invention, with a cylindrical body; and

FIG. 2, a second embodiment of the invention, with an oval hollow body;

FIG. 3 shows a cross-section of a further embodiment of the invention with a cylindrical body;

FIG. 4 shows a cross-section of a further embodiment of the invention having an oval hollow body;

FIG. 4a shows a cross-section through the oval hollow body along line IVa—IVa;

FIG. 5 shows a cross-section of a further embodiment of the invention having an oval hollow body.

Figure 1:
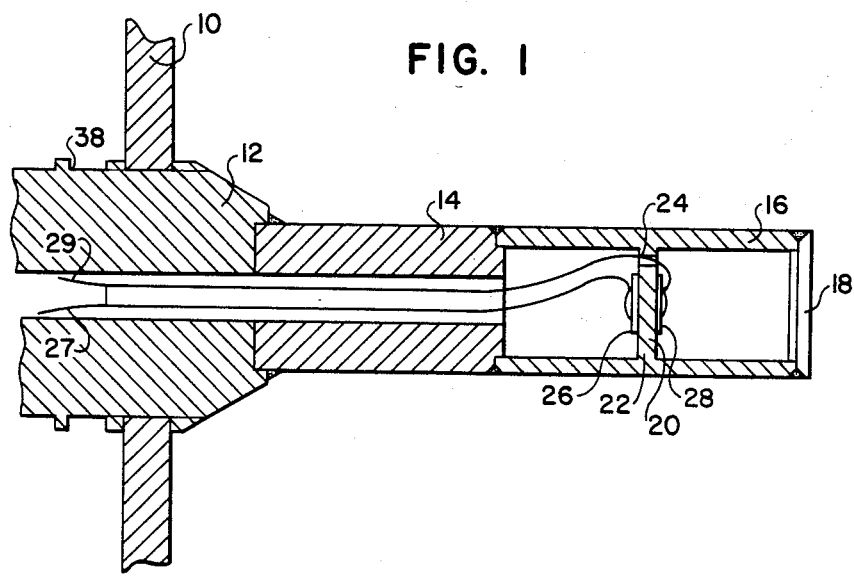

FIG. 1 is a diagram of a part of a container wall 10, in which the device according to the invention is fastened detachably by a screw-in part 12, having threads 38. A shaft 14 connected with screw-in part 12, to which is fastened a cylindrical hollow body 16 of identical or different diameter to or from that of shaft 14, projects into the chamber of the container. Cylindrical hollow body 16 is closed by a cover 18 mounted on its end opposite shaft 14, opposite the inside of the container and thus in the filling material. Within cylindrical body 16 is mounted a crosspiece 20 configured as a disk, of which the normal plane surface is oriented parallel to the longitudinal axis of cylindrical body 16 and which is connected around its periphery with cylindrical body 16, as here shown at two section points 22 and 24.

A first electromechanical transducer 26 is mounted on one of the surfaces of disk 20 in the customary manner, for example by means of a standard adhesive. From transducer 26, a wire 27 extends through the center of shaft 14 and screw-in part 12 to the outside, where it is connected with a circuit which is not shown in any detail, which in the customary manner supplies the oscillation energy for transducer 26. A second electromechanical transducer 28 is mounted on the other surface of disk 20 in the same or similar manner as transducer 26. In the same manner as wire 27, a wire 29 projects from transducer 28 and leads to a detection circuit which is not shown in any further detail.

If transducer 26 is now excited by oscillation energy and oscillates mechanically, then it displaces disk 20 which is tightly connected with it, causing it to oscillate radially, and the oscillations are transmitted through attachment points 22, 24 to cylindrical body 16 and cause a radial pulsation of the cylindrical body.

This oscillation of the outside wall of cylindrical body 16 is suppressed upon engagement of cylindrical body 16 with the filling material. The second electromechanical transducer 28 gives an electric signal of the same frequency with which the wall of cylindrical wall 16 oscillates. The amplitude of this electric signal is dependent upon the oscillation amplitude of cylindrical body 16, and with suppression, the oscillatin is changed and therefore the amplitude of the electric signal being discharged from transducer 28 is also changed. The amplitude of the electric signal is picked up by wire 29 of a traditional detection circuit, and as is customary, a signal function is excited when a certain wave length is crossed in either direction, which indicates whether there is contact or not of the filling level measuring device with the filling material.

Figure 2:
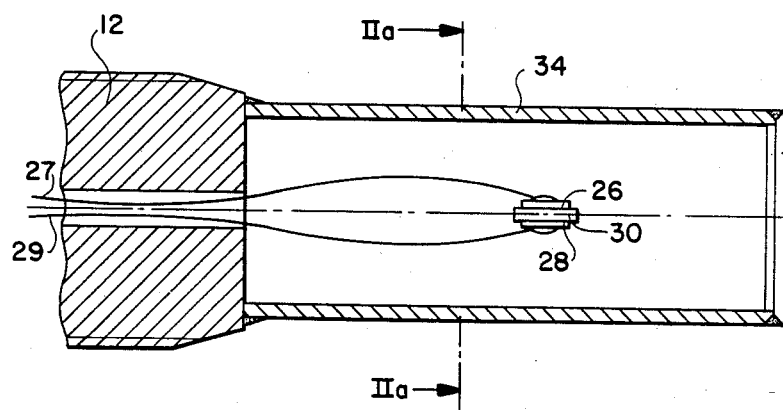
FIG. 2a shows a cross-section through the oval hollow body along line IIa—IIa.

The embodiment shown in FIG. 2 of the present invention has a screw-in part 12 and a hollow body 34 fastened directly thereon, and the basic difference between this and the other embodiment is that, as opposed to FIG. 1, no shaft 14 is provided between screw-in part and hollow body 34. Shaft 14 however could also be inserted in the embodiment of FIG. 2 or, dependent upon conditions, could also be deleted from the embodiment of FIG. 1.

Figure 2A:
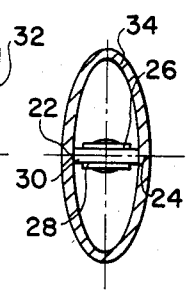

The oval transverse cross section of hollow body 34 according to the embodiment of FIG. 2 is shown particularly clearly in FIG. 2a. Hollow body 34 is closed off from the inside of the container by a cover 32. This cover can be as already described in connection with cover 18 of the first embodiment of the invention The crosspiece 30 is constructed in this oval embodiment as a rod. An electromechanical transducer 26 and an electromechanical transducer 28 are mounted one on each side of the rod. When transducer 26 is fed sufficient energy through wire 27, it causes the attached crosspiece 30 to oscillate in the direction of attachment points 22 and 24. These oscillations cause oscillation of outside wall 34, which oscillations are strongest through attachment points 22 and 24. These oscillations are provided in an already described manner from transducer 28 transformed into electric signals and passed through wire 29 to the detection circuit.

Various other configurations for mounting of the transducers are also possible. As shown in FIG. 3, transducers 26 and 28 can both be mounted on one side of crosspiece 20.

As shown in FIGS. 4 and 4a, first transducer 26 can itself be a crosspiece. In FIGS. 4 and 4a, second transducer 28 is not mounted on the crosspiece at all, but is instead mounted on an inside wall of the hollow body 34.

According to a further embodiment of the invention shown in FIG. 5, one transducer 42 is mounted as the cross piece of the hollow body 40, while the other transducer 44 is mounted on the first transducer 42.

We claim:

1. An apparatus for determining the filling level of a material in a container comprising:
   (a) an elongated hollow tubular body adapted to vibrate;

(b) a transverse member extending normal to the longitudinal axis of said tubular body, fixed to at least two points on the inner surface of said tubular body, and located between the ends of said tubular body, said transverse member having first and second opposite surfaces;

(c) a first electromechanical transducer located within said tubular body, mounted on said first surface of said transverse member and connected to an electrical conductor for supply of electrical oscillation energy, for causing said first transducer to vibrate when excited and transmit said vibrations to said transverse member and said tubular body; and (d) a second electromechanical transducer located within said tubular body and coupled thereto for vibrating therewith, and connected to an electrical conductor for transmitting electrical signals to a detection means;

whereby upon excitation of said first electromechanical transducer, said transverse member and said tubular body are caused to vibrate, causing said second electromechanical transducer to transmit a signal to said detection means, the amplitude of the signal depending upon the damping effect on said tubular body of the material whose level is being determined.

2. The apparatus of claim 1, wherein said tubular body is in the form of a cylinder.

3. The apparatus of claim 1 or 2, wherein said tubular body is closed at one end by a cover.

4. The apparatus of claim 3, wherein said tubular body is closed at the end oposite said one end by a mounting member.

5. The apparatus of claim 1 or 2, wherein said tubular body is of circular cross section and said transverse member is a circular disc.

6. The apparatus of claim 1 or 2, wherein said tubular body is of elliptical cross section and said transverse member is in the form of a rod extending along a short elliptical axis of said cross section.

7. The apparatus of claim 1 or 2, wherein said second electromechanical transducer is mounted on said transverse member.

8. The apparatus of claim 7, wherein said second electromechanical transducer is mounted on the same side of said transverse member as said first electromechanical transducer.

9. The apparatus of claim 7, wherein said second electromechanical transducer is mounted on the opposite side of said transverse member from said first electromechanical transducer.

10. The apparatus of claim 1 or 2, wherein said tubular body is provided with a threaded portion adapted to be screwed into a wall of a container.

11. The apparatus of claim 1 or 2, wherein said first electromechanical transducer constitutes said transverse member.

12. The apparatus of claim 1 or 2, wherein said second electromechanical transducer constitutes said transverse member.

13. The apparatus of claim 1 or 2, wherein said transverse member is located approximately in the middle of the length of said tubular body.

14. The apparatus of claim 1 or 2, wherein said second electromechanical transducer is located at a point within said tubular body other than on said transverse member.

15. The apparatus of claim 1 or 2, wherein said first electromechanical transducer is a piezo-electric transducer.

16. The apparatus of claim 1 or 2, wherein said second electromechanical transducer is a piezo-electric transducer.

17. The apparatus of claim 1 or 2, wherein said tubular body is closed at one end by a mounting member.

18. The apparatus of claim 5, wherein the planar surfaces of said disc are located parallel to said circular cross section.

* * * * *